United States Patent [19]

Hayama et al.

[11] Patent Number: 5,288,360
[45] Date of Patent: Feb. 22, 1994

[54] ADHESIVE RESIN COMPOSITION

[75] Inventors: Kazuhide Hayama; Kazuyuki Hata; Keizo Abe; Takahiro Ozu, all of Yokkaichi, Japan

[73] Assignee: Mitsubishi Petrochemical Company, Ltd., Tokyo, Japan

[21] Appl. No.: 959,466

[22] Filed: Oct. 9, 1992

Related U.S. Application Data

[62] Division of Ser. No. 888,621, May 27, 1992, abandoned.

[30] Foreign Application Priority Data

May 27, 1991 [JP] Japan ............................. 3-121370

[51] Int. Cl.⁵ .................. C09J 4/00; C08F 283/00
[52] U.S. Cl. ................................ 156/330; 525/531; 525/532; 525/533; 525/922; 528/112; 428/416
[58] Field of Search ................ 428/416; 156/330; 525/531, 922, 532, 533; 528/112

[56] References Cited

U.S. PATENT DOCUMENTS

| | | | |
|---|---|---|---|
| 3,506,736 | 4/1970 | Najvar | 260/835 |
| 3,717,543 | 2/1973 | Sinclair et al. | 428/416 |
| 3,853,690 | 12/1974 | McGarry et al. | 428/416 |
| 3,874,903 | 4/1975 | Wirth et al. | 428/416 |
| 4,377,433 | 3/1983 | Merz et al. | 523/411 |
| 4,540,752 | 9/1985 | McFadden | 525/531 |
| 4,963,617 | 10/1990 | Fourquier et al. | 524/808 |
| 4,999,136 | 3/1991 | Su et al. | 523/457 |

FOREIGN PATENT DOCUMENTS 0199671 10/1986 European Pat. Off.

OTHER PUBLICATIONS

Chemical Abstracts, vol. 81, No. 10, Oct. 9, 1974, Columbus, Ohio, US; abstract No. 50530R, 'Air inhibited adhesive for metal', p. 37; col. 2.
Chemical Abstracts, vol. 99, No. 22, Nov. 1983, Columbus, Ohio, US; abstract No. 177225X, 'Thermosetting binder' p. 66; col. 1.
Chemical Abstracts, vol. 100, No. 24, Jun. 1984, Columbus, Ohio, US; abstract No. 193665K, 'Stable aqueous emulsion composition for adherent coating', p. 97; col. 1.

*Primary Examiner*—Melvyn I. Marquis
*Assistant Examiner*—Randy Gulakowski
*Attorney, Agent, or Firm*—Oblon, Spivak, McClelland, Maier & Neustadt

[57] ABSTRACT

An adhesive resin composition comprising a polymer of a radically polymerizable epoxy resin (I) and a monomer (c), the radically polymerizable epoxy resin (I) being a reaction product between an epoxy resin (a) and a radically polymerizable monomer (b) having a function group reactive to epoxy group or hydroxyl group in said epoxy resin (a), having an equivalent ratio (b)/(a)=0.01~0.9 and said monomer (c) being copolymerizable with said radically polymerizable epoxy resin (I) and containing alkyl (meth)acrylate and/or a fluorine-containing unsaturated monomer serving as an indispensable component. The adhesive resin composition has an excellent adhesion between fluorine-contained resins and metal substrates.

13 Claims, No Drawings

ADHESIVE RESIN COMPOSITION

This application is a division of application Ser. No. 07/888,621, filed on May 27, 1992, now abandoned.

BACKGROUND OF THE INVENTION

1. Field of the Invention

The present invention relates to an adhesive resin composition and, more particularly, to an adhesive resin composition effective in adhering fluorine-contained resins to metal substrates.

2. Description of the Prior Art

Since fluorine contained resins have excellent hardness and are extremely resistant to abrasion, chemicals and solvents and have weatherability, they have very favorable properties for use as covering materials, and are extensively used as a coating materials on various substrates.

Fluorine-contained resins, however, are poor to adhere to various substrates. Even when coated on the surfaces of various substrates, the films formed are easily peeled off.

To improve the poor adhesion of fluorine-contained resins to, for example, metal substrates, a method for utilizing a composition as an undercoating, comprising an epoxy acrylate resin, a vinylidene fluoride resin, a methacrylate resin, etc is disclosed in Japanese Patent Laid-open No. 1-149800. Another method (or utilizing a composition as an undercoating is disclosed in Japanese Patent Laid-Open No. 2-47176, which composition comprises a thermoplastic methacrylic resin and an epoxy and/or epoxy phenol resin.

However, the technique of coating fluorine-contained resins to metal substrates is not yet fully developed in that films formed are easily peeled off.

The present invention solves the above problem of the conventional art, and the object thereof is to provide an adhesive resin composition effective in adhering fluorine-contained resins to metal substrates.

SUMMARY OF THE INVENTION

As a result of thorough investigation, the present inventors were able to solve the above problem.

According to this invention, there is provided an adhesive resin composition comprising a polymer of a radically polymerizable epoxy resin (I) and a monomer (c), the radically polymerizable epoxy resin (I) being a reaction product between an epoxy resin (a) and a radically polymerizable monomer (b) having a function group reactive to epoxy group or hydroxyl group in the epoxy resin (a), having an equivalent ratio (b')/(a')=0.01~0.9 (wherein, (b') represents an equivalent of said function group of the radically polymerizable monomer (b) which reacted with the epoxy resin (a), and (a') represents an equivalent of said epoxy group or hydroxyl group in the epoxy resin (a)) and said monomer (c) being copolymerizable with the radically polymerizable epoxy resin (I) and containing alkyl methacrylate and/or a fluorine-contained unsaturated monomer serving as an indispensable component.

DETAILED DESCRIPTION OF THE INVENTION

The present invention will be described below in more detail.

Epoxy Resin (a)

Various types of epoxy resins may be employed in this invention. For example, a reaction product of polyphenol and epichlorohydrin (e.g.. glycidyl ether of bisphenol A); a reaction product of an alkylene oxide-addition product of polyphenol and epichlorohydrin (e.g., glycidyl ether of ethylene oxide and/or a propylene oxide-addition product of bisphenol A); a reaction product of aliphatic polyhydric alcohol and epichlorohydrin (e.g., glycidyl ether of glycerin or glycidyl ether of 1,6-hexanediol); a hydrogenated product of a reaction product of polyphenol or an alkylene oxide-addition product of polyphenol and epochlorohydrin (e.g., hydrogenated glycidyl ether of bisphenol A), may be employed. These epoxy resins generally have hydroxyl groups as well as epoxy groups and are increased in molecular weight, by the reaction of glycidyl ether produced and polyphenol. Of these epoxy resins, glycidyl ether of bisphenol A type is desirable. For example, these epoxy resins include Epicoat 827, 828 (manufactured by Yuka-Shell Epoxy Co., general-purpose liquid type), Epicoat 1001, 1004, 1007, 1010 (manufactured by Yuka-Shell Epoxy Co., general purpose solid type). etc.

Radical Polymerizable Monomer (b)

Radical polymerizable monomers (b) which may be used in the present invention include a radically polymerizable monomer (b) which has a function group reactive to the epoxy group or hydroxyl group of the epoxy resin (a) such as carboxyl and hydroxyl groups.

Unsaturated acids, such as (meth)acrylic acid; and carboxyalkyl vinyl ethers, such as carboxy ethyl vinyl ether and carboxy propyl vinyl ether, may he used as the radically polymerizable monomer having the carboxyl group.

Hydroxy alkyl (meth)acrylates, such as 2-hydroxy ethyl (meth)acrylate, 2-hydroxy propyl (meth)acrylate and 2-hydroxy butyl (meth)acrylate; N-methylol (meth)acrylamides; 2-hydroxy ethyl acrylate-6-hexanoid addition polymers; alkenyl alcohols, such as 2-propene-1-ol; alkynyl alcohols such as 2-propyne-1-ol, hydroxy vinyl ether; etc. may be used as the radically polymerizable monomer having the hydroxyl group.

Of the above-mentioned monomers, as the radically polymerizable monomers having the carboxyl group, (meth)acrylic acid and N-methylol (meth)acrylamides, as the radically polymerizable monomer having the hydroxyl group, are the most desirable.

Radically Copolymerizable Epoxy Resin (I)

The reaction between epoxy resin (a) and the polymerizable monomer (b) will now be described.

It is desirable that the polymerizable monomer (b) be mixed and reacted with the epoxy resin (a) to yield the radically polymerizable epoxy resin (I) in a manner that the equivalent of the polymerizable monomer (b) which reacted with the epoxy resin (a) becomes 0.01 to 0.9, and more preferably, 0.1 to 0.7 to 1 equivalent of the epoxy or hydroxyl group of the epoxy resin (a).

If the equivalent ratio of the polymerizable monomer (b) is less than 0.01, when a radically copolymerizable epoxy resin (I) and a monomer (c), both described later, are copolymerized together, the content of the homopolymer of the monomer (c) increases. If the above equivalent ratio exceeds 0.9, gelation is likely to occur during the copolymerization reaction, and adhesion of the produced resin composition to metal substrate becomes unsatisfactory since remaining epoxy or hydroxyl group is few.

In order to obtain a desired radically polymerizable epoxy resin (I), generally, an excess amount of a radically polymerizable monomer (b), for example, in an equivalent ratio (b')/(a')=0.1~3 (wherein, (b') represents an equivalent of said function group of the radically polymerizable monomer (b) and (a') represents an equivalent of said epoxy group or hydroxyl group in the epoxy resin (a)) are mixed and reacted with the epoxy resin (a) while measuring the conversion rate of the monomer (b) and the reaction is stopped by cooling at a desired conversion.

Preferably, the conversion rate of the monomer (b) is usually 30 to 90%. After the reaction, unreacted monomer (b) may be removed but conveniently, the unreacted monomer (b) as such is used in the copolymerization reaction as an optional component of monomer (c) described below.

The temperature at which the epoxy resin (a) is reacted with the monomer (b) usually ranges from 30° to 200° C., and preferably, from 50° to 150° C. A catalyst may be employed to promote the reaction. Acidic or basic compounds, such as hydrochloric acid, sulfuric acid and p-toluene sulfonic acid, boron trifluoride, zinc chloride, sodium hydroxide, calcium hydroxide, pyridine, triethylamine, dimethylbenzylamine, and tetramethyl ammonium chloride, may be used as the catalyst.

Preferably, this reaction can be carried out in an oxygen or air atmosphere. This makes it possible to inhibit the generation of the homopolymer of the monomer (c) when the resin (I) is copolymerized with the monomer (c). Desirably, an appropriate amount of copolymerization inhibitor, such as hydroquinone, hydroquinone monomethyl ether or phenothiazine, is added during this reaction. It is preferable that the reaction be performed in an appropriate organic solvent, for example, toluene, xylene, methyl ethyl ketone, methyl isobutyl ketone, cyclohexanone, butyl acetate, cellosolve acetate, and mixtures thereof may be used as the organic solvent.

The above-mentioned reaction produces the radically copolymerizable epoxy resin (I). It is preferable that the weight-average molecular weight of the radically copolymerizable epoxy resin (I) according to the present invention ranges from approximately 200 to 100,000, and more preferably, from approximately 1,000 to 10,000. If the molecular weight is too low, adhesion of resin composition to metal substrates is insufficient. If the molecular weight is too high, the resin (I) is likely to gel when it is copolymerized with the monomer (c).

Monomer (c) Copolymerizable with Resin (I)

The monomer (c), which is capable of being copolymerized with the resin (I) and may be employed in this invention, contains alkyl (meth)acrylate and/or a fluorine-containing unsaturated monomer serving as essential component. In other words, the monomer (c) may contain another monomer which can be copolymerized with the resin (I), in addition to the essential component.

For instance, methyl (meth)acrylate, ethyl(meth)acrylate, butyl (meth)acrylate, 2-ethylhexyl(meth)acrylate, etc. may be used as alkyl (meth)acrylate, which is the essential component. Methyl methacrylate and methyl acrylate, in particular, are the most desirable.

Fluoroalkyl (meth)acrylates, such as trifluoroethyl(meth)acrylate, tetrafluoropropyl(meth)acrylate, hexafluorobutyl(meth)acrylate, octafluoropentyl(meth)acrylate, heptadecafluorononyl(meth)acrylate and heptadecafluorodecyl(meth)acrylate; and fluorine-containing olefins, such as tetrafluoroethylene, trifluoroethylene, vinylidene fluoride, vinyl fluoride. monochlorotrifluoroethylene, 1,chloro 2,2-difluoroethylene. 1,1'-dichloro-2,2-difluoroethylene, vinylidenechlorofluoride, hexafluoropropene, 3,3,3,2-fluoropropene, 2-chloro-1,1,3,3,3-pentafluroropropene, 1,1,2-trichloro-3-trifluoropropene, perfluoro-1-butene, perfluoro-1-pentene, perfluorobutylethylene,, perfluoro 1-heptene, perfluoro-1-nonene, 8-H-perfluoro-1-octene, perfluorohexylenthylene, perfluorooctylethylene. perfluorodecylethylene and perfluorododecylethylene, may be used as the fluorine-containing unsaturated monomer. Of the above-mentioned substances, fluoroalkyl(meth)acrylates are the most desirable.

The content of the essential component in the monomer (c) should be 30 wt % or more, and preferably, 50 wt % or more. If the content is less than 30 wt %, the adhesion of the adhesive resin composition to fluorine-contained resins is insufficient.

$\alpha,\beta$-unsaturated carboxylic acids, such as (meth)acrylic acid and monoalkyl maleate; (meth)acrylic phosphates, such as mono(2-(meth)acryloyloxyethyl) acid phosphate; hydroxy alkyl(meth)acrylates, such as 2-hydroxypropyl(meth)acrylate and 2-hydroxybutyl(meth)acrylate; polymerizable monomers, having an oxyrane group, such as glycidyl(meth)acrylate; unsaturated amides, such as (meth)acrylamide; (meth)acrylonitrile; epoxy acrylates; (meth)acrylates of alkylene oxide-addition products; (meth)acrylates of multivalent alcohols, such as ethylene glycol di(meth)acrylate and propykene glycol (meth)acrylate; urethane-modified polyvalent acrylates having a (meth)acryloyl group within one molecule; vinyl acetates; vinyl chlorides; vinyl ethers, such as ethyl vinyl ether, butyl vinyl ether and hexyl vinyl ether; aromatic compounds, having vinyl groups such as vinyltoluene, stylene and $\alpha$-methylstyrene; olefins, such as ethylene, propylene, butene and isoprene; etc. may be used as a monomer which may be added in addition to the essential component.

The adhesive resin composition of the present invention can be obtained by copolymerizing the above-described radically copolymerizable epoxy resin (I) and monomer (c). The amount of the monomer (c) to the total weight of the resin (I) and monomer (c) ranges from 10 to 90 wt %, and more preferably, from 30 to 70 wt %. If it is less than 10 wt %, the adhesive resin composition is insufficient to adhere to fluorine contained resins. If it is more than 90 wt %, the adhesive resin composition is insufficient to adhere to the metal substrate.

Organic solvents, such as toluene, xylene, methyl ethyl ketone, methyl isobutyl ketone, cyclohexanone, butyl acetate and Cellosolve acetate, are used as a reaction solvent. Peroxide such as di-t-butyl peroxide, dibenzoyl peroxide, dicumyl peroxide and cumene hydro peroxide; or an azonitrile system compound, such as azobisisobutyronitrile, is used as a copolymerization catalyst for the monomer (c). 0.1 to 10 wt %. and preferably, 1 to 5 wt % based on the amount of the monomer (c) of such a copolymerization catalyst is employed. The mixture is heated to 50° to 200° C. for 1 to 20 hours to copolymerize the radically copolymerizable epoxy resin (I) with the monomer (c). Preferably, this reaction is carried out in an inactive gas atmosphere, such as nitrogen gas. For the purpose of reducing the amount of residual monomer, an azonitrile type compound and a peroxide may be used in combination so as to serve as an initiator of polymerization.

The amount of the reaction solvent is adjusted so that the total weight of the resin (I) and the monomer (c) becomes 5 to 50 wt % based on the total weight of the reaction mixture.

The product of the copolymerization reaction mentioned above partially contains a homopolymer, however, when used as an adhesive resin composition of this invention, a solution obtained by the above reaction may be employed directly. In such a case, the weight percentage of the adhesive resin composition preferably ranges from 0.5 to 50 wt %, and more preferably, from 3 to 30 wt % based on the total amount. The solvent may be removed from the reaction solution so as to use this adhesive resin composition in the form of powder. Additives, such as anti-oxidizing agents, light stabilizers, ultraviolet light absorbers, lubricants, fire retardants, reinforcing agents, pigments, viscosity modifiers and suspension stabilizers may be mixed as required.

The adhesive resin composition of this invention may be applied to various types of fluorine contained resins and metal substrates. Vinylidene fluoride resins, tetrafluoroethylene resins, tetrafluoroethylene·perfluoroalkoxyethylene copolymer resins, tetrafluoroethylene·hexafluoropropylene perfluoroalkoxyethylene copolymer resins, tetrafluoroethylene·ethylene copolymer resins, trifluorochloroethylene resins, trifluorochloroethylene ethylene copolymer resins, vinyl fluoride resins, etc. may be used as the fluorine-contained resins. Of all the above-mentioned resins, vinylidene fluoride resins are the most desirable. Iron, iron alloys, aluminum, aluminum alloys, copper, copper alloys, stainless steels, etc. may be used as the metal substrate.

The shape of the metal substrate is not limited, It is desirable that the surface of the metal substrate be subjected to treatments, such as corona discharge, chromic acid, flame and organic solvent treatments.

Ordinary application techniques, such as brushing, spraying, dipping, and casting, are employed to apply the adhesive resin composition according to the present invention in the form of a solution to the surface of the metal substrate or fluorine-contained resin film. The amount applied depends upon the type of metal substrate or fluorine-contained resin film, and the mixing ratio of various components contained in the adhesive resin composition. However, it is recommended that the adhesive resin composition be applied in a dry thickness of 1 to 100 μm. After the adhesive resin composition has been applied and dried, then after it is heated to from 150° to 300° C. for approximately 1 to 30 minutes if required. The thus formed coating can be laminated by extrusion, heat, or heat press lamination methods. Fluidization dipping, electrostatic coating and rotational molding methods, utilizing the adhesive resin powder of this invention and then fluorine-contained resin powder, may be employed, when the resin powder is applied to molded metal substrate.

EXAMPLES

The present invention will be described below in accordance with the following examples.

EXAMPLE 1

20 g of epoxy resin of a bisphenol A glycidyl ether type, (EX-1009), which has an epoxy equivalent of 2484 and average molecular weight of 3750 and is manufactured by Yuka-Shell Epoxy Co.. Ltd., as an epoxy resin (a); 1.16 g of acrylic acid as a monomer (b) (equivalent ratio: carboxyl group/epoxy group=2/1); 1 g of dimethylbenzylamine as a catalyst; 0.06 g of hydroquinone monomethyl ether as a polymerization inhibitor; and 80 g of xylene and 80 g of cyclohexanone, were charged into a glass flask equipped with an agitator, a reflux condenser, a dropping funnel and a thermometer. Under air stream, the mixture was heated to 110° C., and then an esterification reaction was carried out at the same temperature for 8 hours. Acid value of the reaction product was measured and it was found that 56% of the epoxy group was esterified by the acrylic acid (equivalent ratio: carboxyl group/epoxy group=0.56/1).

Thereafter, the system was flushed with nitrogen, and the temperature was lowered to 90° C. 20 g of methyl methacrylate, as a monomer (c), and 0.12 g of azobisisobutyronitrile, as a copolymerization catalyst, were added and reaction was conducted at 90° C. for 5 hours. Then, 0.12 g of azobisisobutylonitrile was again added. The product was allowed to react for 5 hours, and then cooled and used as an adhesive resin composition.

A bar coater was utilized to apply the adhesive resin composition to a 50 μm thick polyvinylidene fluoride film (KYNAR), manufactured by Atochem North America Co., Ltd., to form a 5 μm thick of the coated film. The adhesion coated film was laminated on a chromic acid-treated steel plate by a heat lamination method at 200° C. and 20 kg/cm$^2$.

When 180° peel strength of the above obtained laminate was measured by an autograph, (AUTO GRAPH D33500, manufactured by Shimadzu Corp.), a peel strength of 8.2 kg/20 mm width at 23° C. was obtained.

COMPARATIVE EXAMPLE 1

20 g of epoxy resin (EX-1009), having epoxy equivalent of 2484 and average molecular weight of 3750 manufactured by Yuka Shell Epoxy Co., Ltd.; 20 g of methyl methacrylate, 0.12 g of azobisisobutyronitrile; 80 g of xylene and 80 g of cyclohexanone were charged into a glass flask equipped with an agitator, a reflux condenser, a dropping funnel and a thermometer. The system was flushed with nitrogen, and the temperature was increased to 90° C. The product was allowed to react at 90° C. for 5 hours. Then, 0.12 g of azobisisobutyronitrile was added again, and then the product was allowed to react for another 5 hours. A resin composition thus obtained was utilized to measure Peel strength in the same manner as in Example 1. It was found that the peel strength was 1.5 kg/20 mm width at 23° C.

EXAMPLES 2 AND 3, AND COMPARATIVE EXAMPLES 2 AND 3

Peel strength was measured in the same way as in Example 1 and Comparative Example 1 except that a methylolmelamine resin, (Cymel 303 manufactured by Mitsui Cyanamid Co.,Ltd.), as a hardening agent was added to the adhesive resin compositions of Example 1 and Comparative Example 1, respectively. The methylolmelamine resin was mixed at the ratio as shown in Table 1. which also shows the results of the measurement. Effective components of the adhesive resin compositions shown in Table 1 refer to adhesive resin contained in the compositions except for the solvent, such as xylene.

TABLE 1

| | Composition (weight ratio) | | | Peel Strength (kg/20 mm width) |
|---|---|---|---|---|
| | Example 1 | Comp. Example 1 | Hardening Agent | |
| Example 2 | 9 | | 1 | 8.4 |
| Example 3 | 8 | | 2 | 7.9 |
| Comp. Ex. 2 | | 9 | 1 | 0.8 |
| Comp. Ex. 3 | | 8 | 2 | 0.5 |

COMPARATIVE EXAMPLE 4 AND 5

Epoxy acrylate (diacrylate of diglycidyl ether of bilsphenol A, which has an average molecular weight of 524 (EA-1370, manufactured by Mitsubishi Petrochemical Co., Ltd.) and methyl methacrylate at the ratio shown in Table 2 were charged into a glass flask equipped with an agitator, a reflux condenser, a dropping funnel and a thermometer. 0.24 g of azobisisobutyronitrile and 160 g of toluene were also charged into the flask. The system was flushed with nitrogen, and the temperature was increased to 90° C. The mixture was allowed to react at 90° C. for 5 hours. Then 0.24 of azobisisobutyronitrile was again added. The product was allowed to react for 5 hours. A resin composition thus obtained was utilized to measure peel strength in the same manner as in Example 1. Table 2 shows the results obtained.

TABLE 2

| | Component (g) | | Solution condition | Peel Strength (kg/20 mm width) |
|---|---|---|---|---|
| | Methyl methacrylate | Epoxy acrylate | | |
| Comp. Ex. 4 | 38 | 2 | Satisfactory | 1.1 |
| Comp. Ex. 5 | 36 | 4 | Gelation | — |

EXAMPLES 4 TO 7

An adhesive resin composition was obtained in the same manner as in Example 1 except that the ratio of the epoxy resin, acrylic acid and methyl methacrylate employed in Example 1 was changed as shown in Table 3.

Peel strength was measured in the same way as in Example 1. Table 3 shows the results obtained.

TABLE 3

| | Component (g) | | | Equivalent ratio of acid/ epoxy group in epoxy resin (I) | Peel Strength (kg/20 mm width) |
|---|---|---|---|---|---|
| | Methyl methacrylate | Epoxy resin | Acrylic acid | | |
| Example 4 | 12 | 28 | 1.62 | 0.61 | 6.2 |
| Example 5 | 16 | 24 | 1.39 | 0.58 | 7.5 |
| Example 6 | 24 | 16 | 0.93 | 0.55 | 7.3 |
| Example 7 | 28 | 12 | 0.70 | 0.51 | 6.9 |

EXAMPLES 8 to 10

Peel strength was measured in the same manner as in Example 1. except that the ratio of acrylic acid and the type of epoxy resin of a bisphenol A glycidyl ether type were changed as shown in Table 4. Table 4 shows the results obtained.

TABLE 4

| | Component (g) | | | Equivalent ratio of acid/ epoxy group in epoxy resin (I) | Peel Strength (kg/20 mm width) |
|---|---|---|---|---|---|
| | Epoxy resin* (molecular weight: epoxy equivalent) | | Acrylic acid | | |
| Example 8 | EX-828 (380:190) | 20 | 1.89 | 0.18 | 6.8 |
| Example 9 | EX-1004 (1600:925) | 20 | 1.56 | 0.38 | 7.9 |
| Example 10 | EX-1007 (2900:1975) | 20 | 1.46 | 0.63 | 8.1 |

*indicates resin manufactured by Yuka-Shell Epoxy Co., Ltd.

EXAMPLE 11

20 g epoxy resin of a bisphenol A glycidyl ether type (EX-1009). which has an average molecular weight of 3750 and is manufactured by Yuka-Shell Epoxy Co., Ltd.. as an epoxy resin (a); 1.06 g of N-methylolacrylamide as a monomer (b) (theoretical equivalent ratio: methylol group/hydroxyl group=0.16/1); 0.1 g of p-toluenesulfonic acid as a catalyst; 0.06 g of hydroquinone monomethyl ether as a polymerization inhibitor; and 80 g of xylene and 80 g of cyclohexanone, were charged into a glass flask equipped with an agitator, a reflux condenser, a filter funnel and a thermometer. Under air stream system the mixture was heated to 110° C., and then an esterification reaction was performed at the same temperature for 8 hours.

The H-NMR analysis of the reaction product showed that 11% of hydroxyl group in the epoxy resin was etherified by N-methylolacrylamide (equivalent ratio: methylol group/hydroxyl group=0.11/1).

Thereafter, the system was flushed with nitrogen, and the temperature was reduced to 90° C. 20 g of methyl methacrylate as a monomer (c), and 0.12 g of azobisisobutyronitrile as a copolymerization catalyst, were then added. The mixture was allowed to react for 2 hours. Then 0.12 g of azobisisobutyronitorile was again added. The product was allowed to react for 2 hours. Such a reaction was repeated four times, and then cooled and used as an adhesive resin composition.

Peel strength was measured in the same manner as in Example 1. The peel strength was 8.8 kg/20 mm width at 23° C.

EXAMPLES 12 to 21

An adhesive resin composition was obtained in the same manner as in Example 11 except that the amount of N-methylolacrylamide and p-toluenesulfonic acid employed in Example 11 was changed as shown in Table 5. An adhesion test was conducted in the same way as in Example 1.

TABLE 5

| | Component (g) | | Equivalent ratio of methylol/ hydroxyl group in epoxy resin (I) | Peel Strength (kg/20 mm width) |
|---|---|---|---|---|
| | N-methylol acrylamide | p-toluene sulfonic acid | | |
| Ex. 12 | 0.53 | 0 | 0.04 | 8.9 |
| Ex. 13 | 1.06 | 0 | 0.08 | 8.7 |
| Ex. 14 | 1.59 | 0 | 0.12 | 8.4 |
| Ex. 15 | 2.65 | 0 | 0.20 | 7.9 |
| Ex. 16 | 0.53 | 0.5 | 0.06 | 8.8 |
| Ex. 17 | 1.06 | 0.5 | 0.14 | 8.7 |
| Ex. 18 | 1.59 | 0.5 | 0.22 | 8.2 |
| Ex. 19 | 2.65 | 0.5 | 0.38 | 7.6 |

TABLE 5-continued

| | Component (g) | | Equivalent ratio of methylol/ hydroxyl group in epoxy resin (I) | Peel Strength (kg/20 mm width) |
|---|---|---|---|---|
| | N-methylol acrylamide | p-toluene sulfonic acid | | |
| Ex. 20 | 0.53 | 1.0 | 0.07 | 8.5 |
| Ex. 21 | 1.06 | 1.0 | 0.15 | 8.0 |

EXAMPLES 22 TO 24

An adhesive resin composition was obtained in the same manner as in Example 11 except that the type of epoxy resin of bisphenol A glycidyl ether and the amount of N-methylolacrylamide mixed in Example 11 were changed as shown in Table 6.

Table 6 shows the results of an adhesion test performed in the same way as in Example 1.

TABLE 6

| | Component (g) | | | Peel Strength (kg/20 mm width) |
|---|---|---|---|---|
| | Epoxy resin* (average molecular weight) | N-methylol acrylamide | Equivalent ratio of methylol/ hydroxyl group in epoxy resin (I) | |
| Ex. 22 | EX-1004 (1600) 20 | 2.53 | 0.42 | 8.0 |
| Ex. 23 | EX-1007 (2900) 20 | 1.18 | 0.17 | 8.5 |
| Ex. 24 | EX-1010 (5500) 20 | 0.62 | 0.08 | 8.8 |

*indicates resin manufactured by Yuka-Shell Epoxy Co., Ltd.

The above-described Examples and Comparative Examples prove that the adhesive resin compositions of the present invention have very good adhesion between fluorine-contained resins and metal substrates.

This invention provides adhesive resin compositions having excellent adhesion between fluorine-contained resins and metal substrates.

What is claimed is:

1. A method of adhering a fluorine-containing resin to a metal substrate comprising:
    applying between a fluorine-containing resin and a metal substrate, an adhering effective amount of an adhesive composition consisting essentially of a polymer of a radically polymerizable epoxy resin (I) and a monomer (c),
    said radically polymerizable epoxy resin (I) being a reaction product between an epoxy resin (a) and a radically polymerizable monomer (b) having a functional group reactive to an epoxy group or a hydroxyl group in said epoxy resin (a) selected from the group consisting of carboxyl groups, hydroxyl groups and a mixture thereof,
    having an equivalent ratio (b')/(a')=0.01–0.9, wherein (b') represents an equivalent of said functional group of said radially polymerizable monomer (b) which reacted with said epoxy resin (a) and (a') represents an equivalent of said epoxy group or hydroxyl group in said epoxy resin (a), and
    said monomer (c) being copolymerizable with said radically polymerizable epoxy resin (I) and containing alkyl(meth)acrylate, fluorine-containing unsaturated monomer, or mixture thereof, serving as an indispensable component.

2. The method of claim 1 wherein said epoxy resin (a) is a reaction product of bisphenol A and epichlorohydrin.

3. The method of claim 1 wherein said radially polymerizable monomer (b) has a carboxyl group.

4. The method of claim 1 wherein said radically polymerizable monomer (b) has a methylol group.

5. The method of claim 1 wherein said radically polymerizable epoxy resin (I) has a weight-average molecular weight ranging approximately form 200 to 100,000.

6. The method of claim 1 wherein the content of said monomer (c) ranges from 10 to 90 wt % with respect to the total amount of said radically polymerizable epoxy resin (I) and said monomer (c).

7. The method of claim 1 wherein the content of the indispensable component in the monomer (c) is 30 wt % or more.

8. The method of claim 1, wherein said fluorine-containing resin is selected from the group consisting of vinylidene fluoride resin, tetrafluoroethylene resin, tetrafluoroethylene-perfluoroalkoxyethylene copolymer resin, tetrafluoroethylene-hexafluoropropylene-perfluoroalkoxyethylene copolymer resin, tetrafluoroethylene-ethylene copolymer resin, trifluorochloroethylene resin, trifluorochloroethylene-ethylene copolymer resin, vinyl fluoride resin and a mixture thereof.

9. The method of claim 1, wherein said metal substrate is selected from the group consisting of iron, iron alloy, aluminum, aluminum alloy, copper, copper alloy and stainless steel.

10. The method of claim 1, wherein said metal substrate to be adhered to said fluorine-containing resin is treated with a treatment selected from the group consisting of corona discharge, chromic acid, flame and organic solvent.

11. The method of claim 1, wherein said adhesive resin composition is applied in a dry thickness of 1 to 100 μm.

12. The method of claim 1, wherein after said adhesive resin composition is applied, it is heated to from 150 to 300° C.

13. A laminate comprising:
    i) a fluorine-containing resin;
    ii) a metal substrate;
    iii) an adhesive composition, wherein said adhesive composition is disposed between said fluorine-containing resin and said metal substrate; and
    wherein said adhesive composition consists essentially of a polymer of a radically polymerizable epoxy resin (I) and a monomer (c),
    said radically polymerizable epoxy resin (I) being a reaction product between an epoxy resin (a) and a radically polymerizable monomer (b) having a functional group reactive to an epoxy group or a hydroxyl group in said epoxy resin (a) selected from the group consisting of carboxyl groups, hydroxyl groups and a mixture thereof,
    having an equivalent ratio (b')/(a')=0.01–0.9, wherein (b') represents an equivalent of said functional group of said radically polymerizable monomer (b) which reacted with said epoxy resin (a) and (a') represents an equivalent of said epoxy group or hydroxyl group in said epoxy resin (a), and
    said monomer (c) being copolymerizable with said radically polymerizable epoxy resin (I) and containing alkyl(meth)acrylate, fluorine-containing unsaturated monomer, or mixture thereof, serving as an indispensable component.

* * * * *